Aug. 14, 1928.  1,680,887
M. M. KINNEY ET AL
COLLAPSIBLE TIRE RIM
Filed July 10, 1925
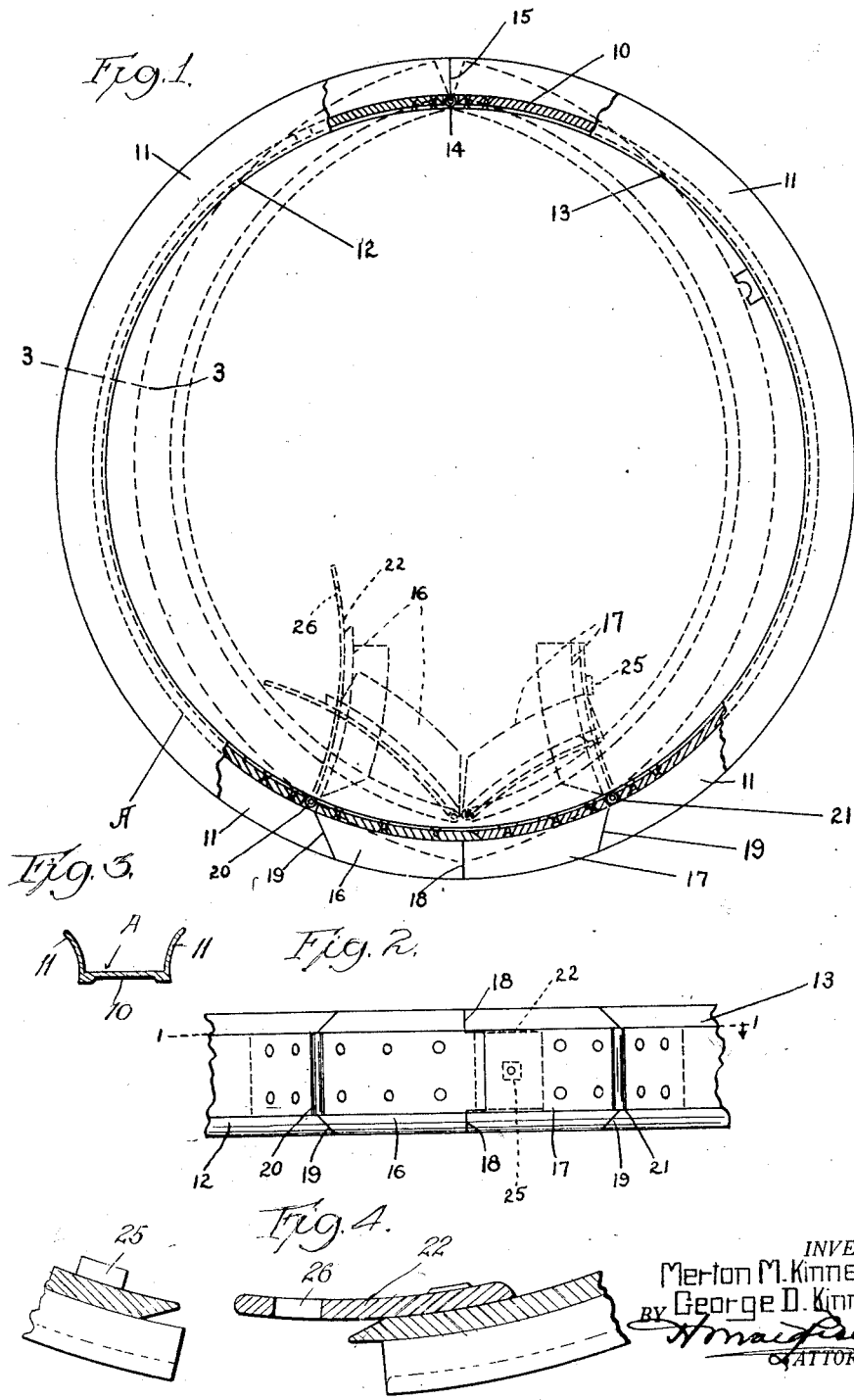
INVENTORS.
Merton M. Kinney
George D. Kinney
BY
ATTORNEY Patented Aug. 14, 1928.

1,680,887

UNITED STATES PATENT OFFICE.

MERTON M. KINNEY AND GEORGE D. KINNEY, OF DULUTH, MINNESOTA.

COLLAPSIBLE TIRE RIM.

Application filed July 10, 1925. Serial No. 42,718.

Our invention relates to tire rims which are particularly adapted to be used with automobile tires of the pneumatic type, so that when the tires are inflated with air they are held firmly on the rim to prevent collapsing and disengagement of the tire from the rim until the tire is deflated.

A feature of the invention is in a rim of which is adapted to be collapsed after the tire is deflated and in the collapsing of the rim it is decreased in size sufficiently so as to permit the tire to be easily disengaged from the sides of the rim. This is accomplished by dividing the rim into sections which are hingedly connected together in a manner so as to firmly hold the parts in position when in use, and when the tire is deflated by pressure at a certain point on the rim portions of the rim will swing inwardly and permit the sides to close in toward each other in a manner to collapse the rim and decrease the size to permit the pneumatic tire to be easily removed therefrom.

Our invention includes an automobile tire rim wherein the sides of the rim are cut diagonally at the joints so as to prevent any side working of the parts of the rim. These sectional parts are hingedly connected together to permit the rim to be collapsed very readily when the tire is deflated.

It is also an object of our invention to provide a tire rim wherein the same is divided into two major portions which are hingedly connected together and to provide other sections of a shorter nature which form the releasing sections or portions of the rim and which are provided with overlapping tongue means together with lug means formed on one of the shorter portions of the sections of the rim which is adapted to extend through the tongue formed on the section to lock the same against free dis-engagement if the tire is partially deflated or worn.

These features together with other details of construction and objects of the invention will be more fully set forth in the following specification and claims.

In the drawings forming part of our specification:

Figure 1 is a side view of our collapsible tire rim, partly illustrated in cross section and illustrating the collapsing position in dotted outline and the sectional illustration in the figure is along the line 1—1 of Figure 2.

Figure 2 is a detail of a portion of the rim taken from the outside of the channel to show the releasing sections of the rim.

Figure 3 is a section on the line 3—3 of Figure 1.

Figure 4 is a view showing the details of the end connection.

In the drawings our collapsible tire rim A is formed of metal or other suitable material, to simulate the ordinary straight side rim, as used for automobile tires.

The rim A is formed of channel metal having the base portion 10 with the straight side walls 11 projecting from the same, so that the ordinary straight side automobile tire can be held therein in the ordinary well known manner, and not illustrated in the drawings.

It is obvious that our tire rim A can be formed with the clincher type side walls in place of the straight side walls 11, without departing from the spirit of our invention and without illustrating the same in the drawings.

Our tire rim A is of a collapsible nature and is provided with two major portions 12 and 13 which are hingedly connected at 14, and divided at 15 in a manner so that the large portions 12 and 13 can be hingedly connected together as illustrated.

We provide releasing rim sections 16 and 17 which are divided on a straight central line 18, and which are divided on the diagonal lines 19 to connect along the divided lines 19 with the major portions 12 and 13 of the rim A, formed in the side walls 11 of the portions 12 and 13 and the sections 16 and 17.

The sections 16 and 17 are hingedly connected at 20 and 21 respectively, to the portions 12 and 13 to permit the sections 16 and 17 to fold inwardly, as illustrated in Figure 1 of the drawings. The sections 16 and 17 are adapted to fold inwardly when the tire carried by the rim A is deflated, and by giving a slight blow at the point where the two short releasing sections 16 and 17 are joined together along the line 18. This causes the sections to turn inwardly as illustrated in dotted outline, and permits the major side portions 12 and 13 to fold inwardly to collapse the rim A.

The portion 17 is adapted to fold beneath the free end of the section 16, with the tongue 22 lapping over the free end of the section 17, when the rim is in expanded position with the sides 11 of the sections 16 and 17 engaging along the line 18, as illustrated in full lines in Figure 1 of the drawings and as illustrated in Figure 2.

When the rim A is in expanded position and the tongue 22 is lapped over the free end of the section 17, the tongue 22 is held firmly to lock the releasing sections 16 and 17 in extended position, to hold the rim A expanded. A square lug 25 is secured to the inner side of the free end of the portion 17, which is adapted to fit into the square opening 26 formed in the tongue 22, which assists in holding the releasing sections against free disengagment, if the tire on the rim A should become partially deflated or worn.

In collapsing the rim A by exerting a pressure along the division 18, the releasing sections 16 and 17 are sprung inwardly to permit the free ends of the sections swinging into the dotted position illustrated in Figure 1, and thus the section 17 folds on to the inner sides 12 and 13 of the rim A. This permits the hinging joints 20 and 21 to come closer together, as illustrated in dotted outline in Figure 1, and thus the diameter and formation of the rim is reduced in this collapsible state. When the rim is so collapsed it can be readily disengaged from the tire and the tire can be re-attached to the rim. In placing the tire on to the rim when it is in the position illustrated in dotted outline, after the tire is in place in the channel of the section between the side walls 11 of the rim A, the releasing sections are moved so that their free ends are positioned in engagement with each other at an angular position from the hinging points 20 and 21 and then by pressing on the free ends with the operator's foot, the sections 16 and 17 will spring into the position illustrated in full lines in Figure 1 to expand the major sections 12 and 13 into operating position. We find that our rim is a very practical means of holding an automobile tire because it permits the tire to be firmly held when the sections of the rim are in operating position, yet it allows the rim to be readily collapsed by pressure at the dividing point and free ends of the releasing sections, and thus permits the tire to be easily removed from the rim when it is deflated. The releasing sections are short as compared to the major side sections 12 and 13 and thus little or no strain is exerted against the same to collapse the rim when the tire is fully expanded as the tire supports the rim in operative position. The diagonal cuts in the side walls 11 of the sections 16 and 17 and the portions 12 and 13 along the lines 19, fit the edges of the rim together against side working and thus hold the portions and sections of the rim firmly in operative position. The features and advantages of our collapsible rim over ordinarily constructed automobile tire rims will be quite apparent as above fully set forth.

In accordance with the patent statutes we have described the principles of operation of our collapsible tire rim and we desire to have it understood that the drawings are only illustrative and that the invention can be carried out by other means and applied to uses other than those above set forth within the scope of the following claims.

We claim—

1. A collapsible tire rim for pneumatic tires including sections hinged together, a releasing section including a pair of rim sections hinged to the free ends of the first mentioned sections hinged together, said releasing sections including a projecting tongue from one of said sections having an opening extending therethrough, a lip adjacent said tongue and adapted to project at a distance from the edge of the section carrying said tongue and inside of said tongue, a lug projecting from the other section adapted to be engaged by said projecting tongue in the opening thereof and a recessed portion in the edge of said section adapted to receive and lock the projecting short tongue on the other releasing section.

2. A collapsible tire rim for tires comprising sections hinged together, a releasing section including a pair of members hinged to said first mentioned sections, one of said members having a long and short tongue, one positioned inside of the other, said long tongue having an opening therein and the other of said releasing sections having a recess and lug which are adapted to lock the short and long tongue respectively of said releasing sections together in locking position.

MERTON M. KINNEY.
GEORGE D. KINNEY.